United States Patent [19]
Amberg et al.

[11] 3,833,332
[45] Sept. 3, 1974

[54] APPARATUS FOR FORMING CONTAINERS OF THERMOPLASTIC MATERIAL

[75] Inventors: Ralph G. Amberg, Monticello, Ind.; Stephen W. Amberg, St. James, N.Y.

[73] Assignee: Owens-Illinois, Inc., Toledo, Ohio

[22] Filed: Nov. 17, 1972

[21] Appl. No.: 307,639

[52] U.S. Cl............................................425/387 B, 425/DIG. 208, 425/DIG. 213
[51] Int. Cl............................................B29d 23/03
[58] Field of Search 425/387 B, DIG. 203, DIG. 208, 425/DIG. 213, DIG. 214

[56] References Cited
UNITED STATES PATENTS
3,770,860  11/1973  Amberg et al........................ 264/89
FOREIGN PATENTS OR APPLICATIONS
1,060,249  3/1967  Great Britain Primary Examiner—Richard B. Lazarus
Attorney, Agent, or Firm—Thomas A. Meehan; Edward J. Holler

[57] ABSTRACT

Method and apparatus for reforming thermoplastic preforms or parisons of a nestable configuration into non-nestable containers which are adapted to receive threaded metallic or plastic closures. Each preform is inserted over the end of a complementally shaped heating mandrel to heat the preform to an elevated temperature at which it is sufficiently soft to permit it to be reformed into a different configuration by blow molding. The preform is retained in place during the heating step by a vacuum applied to the inner surface of the preform through the mandrel. Prior to or during the heating step, the mandrel, with the preform in place, is inserted into the open top of a mold, the inner surface of which is, in a major lower portion, configured in the shape of a jar or other container of non-nestable configuration. The upper minor portion of the mold is configured in the shape of an internally threaded cylinder. After the preform reaches a suitably high temperature, the vacuum to the inside surface thereof is terminated and air or other gas pressure is applied thereto through the mandrel to blow or expand the preform to correspond to the interior of the mold, thereby to provide a container with an externally threaded upper neck portion which is adapted to receive a threaded closure. Good contact between the preform heating mandrel and the mold is obtained by providing the preform with a short externally extending continuous flange at its larger open end which serves as a gripping surface to be tightly engaged between the structure carrying the mandrel and mold structure. To avoid the need for a trimming operation, the lateral extent of this flange must be less than the lateral extent of the threaded portion of the neck of the finished container, to avoid interference with the associated closure to be applied thereto. Such a flange, if left in place, will serve to stiffen the mouth of the finished container.

6 Claims, 2 Drawing Figures

APPARATUS FOR FORMING CONTAINERS OF THERMOPLASTIC MATERIAL

GENERAL DESCRIPTION OF THE INVENTION

As is pointed out in co-pending U.S. Pat. application Ser. No. 231,734 now U.S. Pat. No. 3,770,860 in which we are co-inventors with Rodney E. Ludder, and which is assigned to the assignee of this application, dairy and other food products, which have long been packaged in nestable thermoplastic containers because of the ease and economy of the shipment of such containers from the container plant to the filling plant, may be packaged in non-nestable, distinctively shaped packages without sacrificing the manufacturing and transportation advantages of the nestable shape. In the teachings of the aforesaid co-pending application, such result could be obtained by shipping a nested stack of nestable thermoformed thermoplastic preforms or parisons from the container plant to the packaging plant and by denesting, heating and forming such preforms to a final desired shape or form in the packaging plant shortly before it is desired to fill such containers with the product to be packaged therein. By the practice of the teachings of the aforesaid co-pending application, the complexity of the container forming equipment needed in a packaging plant, where it is likely that personnel are relatively unfamiliar with such equipment and/or where available space and/or capital for equipment may be limited, can be greatly simplified vis-a-vis the equipment that is normally used to blow mold bottles or other non-nestable containers from organic thermoplastic material in the usual manner, viz., from pellets or granules thereof. Such simplification of the packaging plant container forming equipment arises from the elimination of the need for the extruder and related equipment, and the trimming and scrap regrinding and recycling equipment that are normally involved in a conventional plastic bottle blow-molding operation.

The aforesaid co-pending patent application, however, does not teach how to produce a container which is adapted to receive a conventional long-skirted threaded metallic or plastic closure, and the durability or sealability of such a closure is desired for many packaging applications. Additionally, the neck forming features of the container-forming apparatus of the aforesaid co-pending patent application involve the use of neck ring elements separate from the blow mold assembly, thereby complicating the construction of the reforming apparatus.

However, it has now been found that a non-nestable thermoplastic container with a superior threaded closure receiving neck can be produced by the practice of the essence of the teachings of the aforesaid co-pending application, but without the need for the complicating neck rings used in the practice thereof. This result can be obtained by forming the uppermost interior surface portion of the associated mold in the form of a cylinder with a relatively long, outwardly extending helical grove therein. Thus, a nestable preform which is reformed to the shape of such mold will have an outwardly extending thread which can be used to receive a mating, internal thread of a metallic or injection molded plastic closure to securely close the completed and filled container.

To serve the rim gripping function which is also served by the neck rings of the apparatus of the aforesaid co-pending application, the preforms to be used in the practice of the present invention are provided with an externally extending continuous planar rim portion at the top or open end thereof, and such rim can be securely engaged between the portion of the apparatus carrying the preform supporting mandrel and the mold apparatus. Such rim portion can, if desired, be trimmed from the completed container in a subsequent operation. However, such rim may be left in place if the original lateral extent (outside diameter) thereof is less than the internal lateral extent (inside diameter) of the thread in the closure to be received on the neck portion of the container, and it is entirely feasible to produce a container with such a realtionship between the rim diameter and thread diameter. When such a rim is left in place, it can be used to advantage as a stiffening flange to stiffen the upper open end of the container produced by the practice of the present invention, thereby making it possible to maintain reduced thicknesses of material in this portion of the container.

Accordingly, it is an object of the present invention to provide a method and apparatus for producing containers adapted to receive threaded closures. It is a further object of the present invention to provide a method and apparatus for producing such containers by reforming nestable preforms so that the containers may be produced at a location not equipped with extrusion facilities. It is a further object of the present invention to provide a reforming method and apparatus that does not involve the use of separate neck rings or rim grippers to produce a container adapted to receive a threaded closure by the reforming of a nestable preform. It is a further object of the present invention to provide a non-nestable thermoplastic container with a rim-reinforced, externally threaded neck portion that is adapted to receive a threaded closure.

For a further understanding of the present invention and the objects thereof, attention is directed to the drawing and following description thereof, to the detailed description of the invention and to the appended claims.

DETAILED DESCRIPTION OF THE INVENTION

Figure 1:
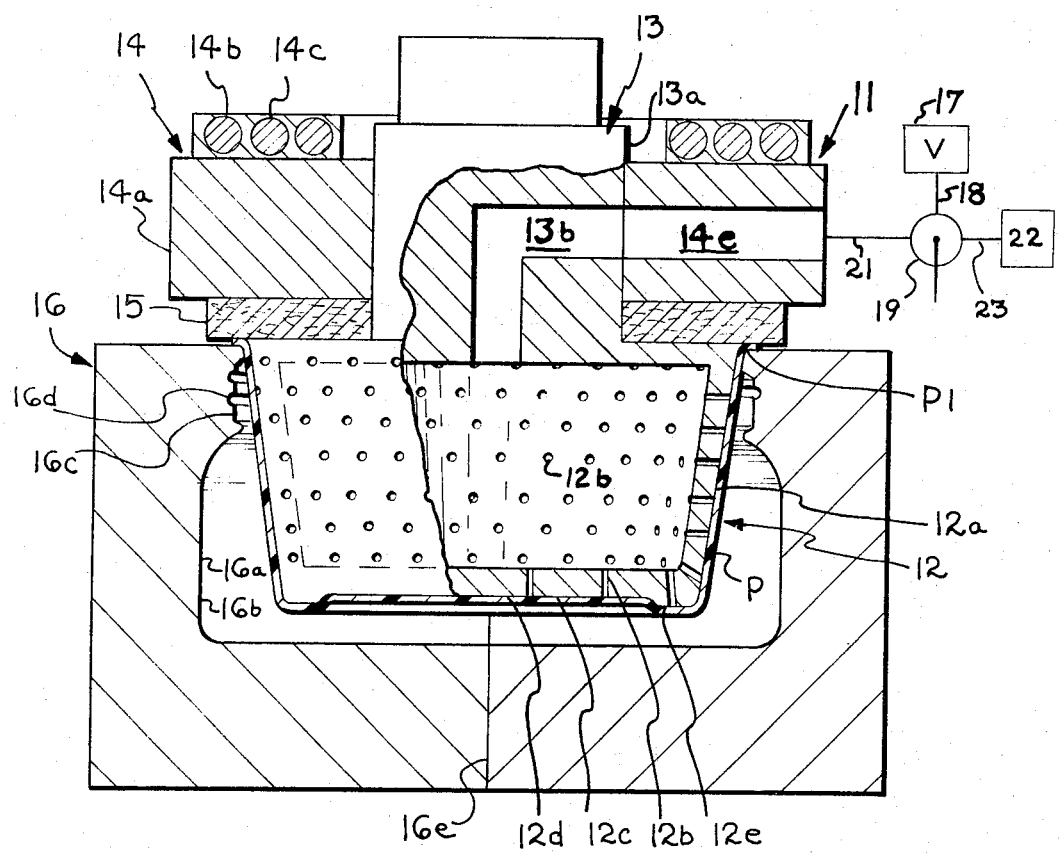
FIG. 1 is an elevational view partly in section, of apparatus in accordance with the present invention.

As is shown in FIG. 1, apparatus in accordance with the present invention comprises a member, indicated generally at 11, which carries at its lower end a depending mandrel 12 of frusto-conical configuration, the smaller end extending away from the structure of the remainder of member 11. Mandrel 12 is of hollow construction, and the sidewall portion 12a which defines the outer frusto-conical configuration of the mandrel is provided with a multitude of small, spaced apart holes 12b extending therethrough. Holes 12b serve a purpose which will hereinafter be described more fully. The bottom of mandrel 12 is closed by a generally horizontally extending wall member 12c, a central portion 12d of which is raised slightly above the elevation of a surrounding annular portion 12e, for purposes which will hereinafter be described more fully. Like sidewall portion 12a, bottom wall portion 12c of mandrel 12 is provided with a multitude of small, spaced apart holes 12b extending therethrough. The mandrel 12 is constructed of a highly conductive material such as aluminum and the thicknesses of wall members 12a and 12b is sufficient to provide good conductive heat transfer from the larger end of the mandrel to the smaller end, by means which will hereinafter be described more fully.

In addition to the mandrel 12, member 11 further comprises a mandrel supporting structure 13 from which mandrel 12 depends. Mandrel supporting structure 13 comprises a central cylindrical spindle portion 13a of structure 13 a which is constructed of a highly conductive material such as aluminum, and spindle portion is closely surrounded by, and is in good conductive heat transfer contact with, a heating collar 14.

Heating collar 14 comprises a relatively massive heat sink member 14a, constructed of a highly conductive material such as aluminum, and a heating element 14b which is attached to member 14a in conductive heat transfer relationship. Heating element 14b may be considered to be a resistance-type heating element, with resistors 14c embedded in a surrounding insulating material. It is to be noted that the lower end of heat sink member 14a terminates above the upper or larger end of mandrel 12, and the space therebetween is occupied by a gasket 15 of a material of a resilient character, and with insulating and heat-resisting properties, such as a silicone rubber.

In opperation, a nestable preform P, formed of a heat-softenable thermoplastic material such as polyethelene or polystyrene, as by thermoforming or injection molding, is inserted over the end of mandrel 12, the mandrel being contoured so that the outer surface of walls 12a and 12c are in good conductive heat transfer relationship with the inner surface of preform P. Preform P is provided with a narrow, outwardly extending the upper P1 at theupper open end thereof and this flange seats against the underside of gasket 15 when the preform P is on the mandrel 12. Thus, by the energizing of resistance heating element 14b, the preform will be heated by heat conducted from element 14b through member 14a, spindle 13a and mandrel 12, and the heating is continued until preform P is heated to a temperature at which it can be reformed. During this heating cycle, the preform is securely maintained in position on the mandrel by vacuum applied through holes 12b, the interior of the hollow mandrel being in communication with a vacuum source 17, through line 18, valve 19, which is of the three-way type for reasons which will subsequently be apparent, line 21 and through aligned passages 13b and 14e extending, respectively, through spindle 13a and member 14a. Accurate positioning of preform P on mandrel 12 is obtained by providing the preform with an upwardly offset central portion P2 in the bottom thereof which is adapted register in the offset portion 12d of the bottom of the mandrel 12.

After the preform P is placed over the mandrel 12 as heretofore explained, the mandrel 12 is inserted into the central open top of a mold 16, the preform being securely positioned in the mold by compressively engaging the flange P1 between the underside of gasket 15 and the annular top surface of the mold, which will prevent the flange P1, or at least an outer portion thereof, from being softened by the heating effects of element 14b. Mold 16 is provided with an internal surface 16a which is outwardly spaced from, and is of a different configuration than, the external surface of preform P. Preferably, a lowermost major portion 16b of mold surface 16a is configured in the form of a non-nestable jar, and this portion merges with an uppermost cylindrical portion 16c which is provided with a radially outwardly extending helical groove 16d running for a substantial portion of the length thereof. For purposes which will hereinafter be discussed more fully, the I.D. of the helical groove 16d is at least slightly greater than the O.D. of the flange P1 of the preform P.

After the preform P is heated to a temperature at which it can be re-shaped or reformed, and while the mandrel 12 with the preform P thereon is still positioned, with respect to mold 16, as is shown in FIG. 1, the vacuum to the interior of the mandrel 12 is terminated and air or another gas under pressure from a source 22, is applied to the inside of the heated preform P, by switching valve 19, through line 23, valve 19, line 21 and through passages 14e and 13b and holes 12b. The effect of this pressure will cause the heated preform to expand outwardly and downwardly until its external surface conforms to the internal surface configuration of mold surface 16a, thereby assuming the shape of the non-nestable container C depicted in FIG. 2. After the reforming operation is completed, the application of air pressure to the interior of mandrel 12 is terminated, the mandrel is withdrawn from the cooperative relationship with mold 16 that is depicted in FIG. 1 and the container C is removed from the mold. In that regard, the mold, in known fashion, may be considered to be comprised of a pair of complemental, partable mold halves, as is indicated by the vertically extending parting line 16e, and the mold halves are parted to facilitate removal of the container C therefrom. At this point, mandrel 12 is ready to receive another preform to be reformed.

Figure 2:
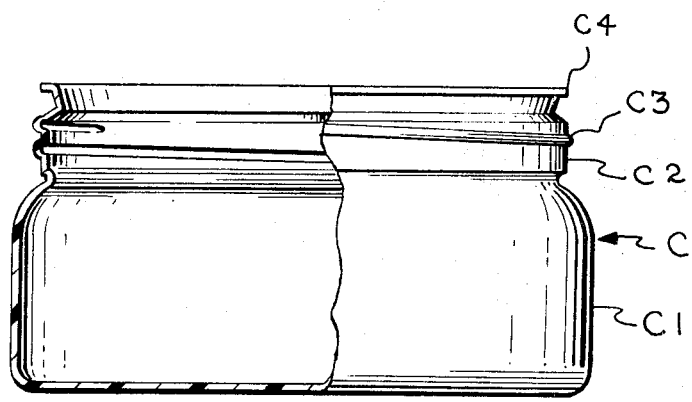
FIG. 2 is an elevational view, partly in section, of a non-nestable container in accordance with the present invention.

Referring more particularly to FIG. 2, a container C produced in accordance with the present invention has an exterior configuration which corresponds to the configuration of the internal surface 16a of mold 16. Consequently, container C will have a lowermost major body portion C1, corresponding in configuration to portion 16b mold 16, and an uppermost minor cylindrical neck portion C2, corresponding in configuration to portion 16c of the mold 16. Neck portion C2, in turn, will comprise an outwardly projecting, helically extending rib C3, corresponding to groove 16e in closure 16. Such rib can be used as a thread to receive and secure a metal or molded plastic threaded closure (not shown) of a conventional character which can be used to securely close the container C after it is filled with the intended product. Because of the dimensional relationship between groove 16e and the flange P1 of preform P, the rib C3 will project outwardly beyond the flange, identified as element C4 in the finished container, thereby making it possible to apply a closure without the need to trim the flange or any portion of it from the finished container. Such a flange can be used to advantage to stiffen the mouth of the finished container, and to provide a flat seat for the associated closure. If desired, however, the flange C4 could be removed in a subsequent trimming operation.

The best mode known to use to carry out this invention has been described above in terms sufficiently full, clear concise and exact as to enable any person skilled in the art to make and use the same. It is to be understood, however, that it is within our contemplation that certain modifications of the above-described mode of practicing the invention can be made by a skilled artisan without departing from the scope of the invention and it is, therefore, desired to limit the invention only in accordance with the appended claims.

We claim:

1. Apparatus for reforming a thermoplastic preform of a nestable shape into a container which is of a different shape and which has an externally threaded neck-portion, said preform having a generally frusto-conically shaped side wall, a bottom wall at the smaller end of the side-wall and integral therewith, and an outwardly extending flange surrounding the larger end of the sidewall and integral therewith, said apparatus comprising, in combination;

ported wall means defining a mandrel whose external surface corresponds in size and shape to the internal surfaces of the sidewall and bottom wall of the preform, said mandrel receiving said preform and being in substantially continuous conductive heat transfer relationship therewith;

means for heating the preform when it is on the mandrel;

an open-top portable mold cavity receiving the mandrel with the preform thereon, said mold cavity having an internal surface spaced outwardly from and shaped differently than the external surface of the preform, a minor portion of said internal surface being an integral part of the mold defining said mold cavity and disposed adjacent to the larger end of the mandrel and being shaped in the form of a cylinder with an outwardly projecting helical groove therein, the maximum inside diameter of the groove being greater than the outside diameter of the flange of the preform;

and means for applying pressure to the inside of the preform after it is at its reforming temperature to reform the preform into the shape of said container including an externally threaded neck portion whose external shape corresponds to the internal shape of the minor portion of the internal surface of the mold cavity.

2. Apparatus according to claim 1 and further comprising means for applying vacuum to the interior of the mandrel while the preform is being heated to maintain the preform in position on the mandrel; and means to discontinue the application of vacuum to the preform before pressure is applied to the inside of the heated preform.

3. Apparatus according to claim 1 wherein the wall means defining the mandrel is formed of a thermally conductive material, and wherein the means for heating the preform comprises means away from the preform for heating the mandrel, whereby the preform will be heated by heat conducted through the mandrel from such means.

4. Apparatus according to claim 1 wherein the wall means defining the mandrel comprises an offset portion adjacent a central portion of the bottom wall of the preform, and wherein the bottom wall of the preform is offset to lie in contact with the offset portion of the wall means to accurately register the preform on the mandrel.

5. Apparatus according to claim 1 and further comprising mandrel supporting structure adapted to firmly press the flange of the preform against the outside of the mold cavity during the reforming of the preform.

6. Apparatus according to claim 5 wherein the flange contacting portion of the mandrel supporting structure is formed of a material of a resilient nature and with good thermal insulating properties to prevent the flange from being softened by the heating effects of the heating means.

* * * * *

UNITED STATES PATENT OFFICE
CERTIFICATE OF CORRECTION

Patent No. 3,833,332           Dated September 3, 1974

Inventor(s) Ralph G. Amberg and Stephen W. Amberg

It is certified that error appears in the above-identified patent and that said Letters Patent are hereby corrected as shown below:

Column 2, line 3, after "extending" insert a comma (,).

Column 3, line 33, change "polyethelene" to -- polyethylene --.

Column 4, line 45, after "16b" insert -- of --.

Column 5, line 26, change "portable" to -- partable --.

Signed and sealed this 11th day of March 1975.

(SEAL)
Attest:

RUTH C. MASON
Attesting Officer

C. MARSHALL DANN
Commissioner of Patents
and Trademarks